(12) United States Patent
Furrer et al.

(10) Patent No.: US 8,887,883 B2
(45) Date of Patent: Nov. 18, 2014

(54) DEVICE FOR THE COUPLING OF ELASTIC AND RIGID CONTACT LINE SYSTEMS

(75) Inventors: Beat Furrer, Bern (CH); Patrick Principe, Bern (CH)

(73) Assignee: Furrer + Frey AG, Bern (CH)

( * ) Notice: Subject to any disclaimer, the term of this patent is extended or adjusted under 35 U.S.C. 154(b) by 186 days.

(21) Appl. No.: 13/581,503

(22) PCT Filed: Feb. 9, 2011

(86) PCT No.: PCT/EP2011/000601
§ 371 (c)(1),
(2), (4) Date: Aug. 28, 2012

(87) PCT Pub. No.: WO2011/107207
PCT Pub. Date: Sep. 9, 2011

(65) Prior Publication Data
US 2012/0325608 A1 Dec. 27, 2012

(30) Foreign Application Priority Data
Mar. 1, 2010 (EP) .................................... 10002057

(51) Int. Cl.
*B60M 1/20* (2006.01)
*B60M 1/26* (2006.01)
*B60M 1/30* (2006.01)

(52) U.S. Cl.
CPC *B60M 1/26* (2013.01); *B60M 1/305* (2013.01)
USPC .............................................. 191/40; 191/43

(58) Field of Classification Search
USPC ........... 191/22 R, 25, 33 R, 40, 41, 42, 43, 44
See application file for complete search history.

(56) References Cited

U.S. PATENT DOCUMENTS

| | | | | |
|---|---|---|---|---|
| 918,761 A | * | 4/1909 | Mayer | 191/43 |
| 2,278,761 A | * | 4/1942 | Benbow | 191/30 |
| 3,985,211 A | * | 10/1976 | Bommart | 191/25 |

(Continued)

FOREIGN PATENT DOCUMENTS

JP 2007307925 11/2007

OTHER PUBLICATIONS

Written Opinion, PCT/EP2011/000601, dated Apr. 18, 2012, 6 pages.

(Continued)

*Primary Examiner* — Jason C Smith
(74) *Attorney, Agent, or Firm* — Senniger Powers LLP (57) ABSTRACT

For the coupling of two parallel contact wires of an elastic contact line system with a rigid contact line system, which has a power track (3) and a contact wire (4) affixed thereon, an elongated cantilever (5) is provided in a transition area, whose rigidity increases in the longitudinal direction from the elastic contact line system to the rigid contact line system. The two contact wires (1, 2) of the elastic contact line system are located along the cantilever parallel to the first contact wire (4), which is, in turn, clamped over the entire length of the cantilever. All three contact wires (1, 2, 4) are affixed on several multiple clamps (9) in the area of the cantilever (5), which clamps are located in a distributed manner along the cantilever. The multiple clamps (9) are located in recesses (12) of the cantilever.

22 Claims, 5 Drawing Sheets

(56) References Cited

U.S. PATENT DOCUMENTS

| | | | | |
|---|---|---|---|---|
| 4,049,092 A | * | 9/1977 | Lillard et al. | 191/40 |
| 4,230,209 A | * | 10/1980 | Ohura et al. | 191/40 |
| 4,363,939 A | * | 12/1982 | Oger | 191/43 |
| 4,428,465 A | * | 1/1984 | Waldmeier | 191/23 A |
| 5,957,254 A | * | 9/1999 | Furrer | 191/40 |
| 6,938,742 B2 | * | 9/2005 | Nunlist et al. | 191/44.1 |
| 2012/0325608 A1 | * | 12/2012 | Furrer et al. | 191/43 |

OTHER PUBLICATIONS

Heroult J C, "La Catenaire Rigide", Revue Generale Des Chemins De Fer, Centrale Des Revues Dunod-Gauthier-Villars, Paris, FR, Nr. 9, Sep. 1, 1992.

Abstract of JP2007307925; Nov. 29, 2007.

International Search Report, PCT/EP2011/000601, dated Apr. 18, 2012, 3 pages.

* cited by examiner

DEVICE FOR THE COUPLING OF ELASTIC AND RIGID CONTACT LINE SYSTEMS

REFERENCE TO RELATED APPLICATIONS

This application is the U.S. national stage application of International Patent Application No. PCT/EP2011/000601, filed Feb. 9, 2011, and claims the benefit of European Application No. 10002057.7, filed Mar. 1, 2010, the entire disclosures of which are incorporated herein by reference.

FIELD OF THE INVENTION

The invention refers to a device for the coupling of elastic and rigid contact line systems for the supply of electrical locomotives.

BACKGROUND

Such a device is known from EP 0 828 629 B1. There it is proposed that an elongated cantilever be placed in the transition area between the rigid contact line system and the elastic contact line system. The mechanical rigidity of the cantilever increases constantly from its free end to a clamped-in rigid end, wherein a continuous contact wire is conducted from the elastic contact line system to the rigid contact line system and is affixed to it by clamping over the entire length of the cantilever. The cantilever is mechanically and electrically coupled with the power track by fishplates, which are located in the interior of the profiles of the cantilever and a rigid power track.

Rigid contact line systems with power tracks are mostly used on sites with limited spatial situations, such as in tunnels or superstructures, since they require a lower system height. Elastic contact line systems have contact wires defined by European norms, which wires are suspended on a carrier cable by means of suspension wires that are suspended at short intervals, wherein the carrying points on the carrier cables are approximately 30-180 cm higher than the contact wire. Furthermore, the contact wires and carrier cable are mechanically tensioned with approximately 8-30 kN, so as to permit abrasion rates up to 500 km/h by the current collectors of electrically driven vehicles, in particular, rail vehicles. The necessary clamping devices are complex units, which are difficult to place, in particular, in underground tunnel routes.

With the cantilever, an elastic transition or coupling area is implemented, whose elasticity increases from its current track-side fixed end to the contact line-side free end. The coupling site between the rigid and flexible contact line parts is thus distributed over a larger distance, wherein the alternating bending stress of the contact wire that arises as a result of the interaction between the current collector and the contact wire is distributed over a greater mechanical length and thus is better dampened. The risk of fatigue breaks on the contact wire is greatly reduced as a result of the elastic coupling.

In actual practice, however, it has become evident that the device in accordance with the state of the art is only conditionally suitable for multiwire contact lines. Direct current railway systems and metro lines frequently use two parallel contact wires in the elastic area of the contact line systems, in order to be able to control the high currents of up to 4000 amperes with the low supply voltages of 750-1500 volts. In the transition range, this would also require three cantilevers conducted parallel to the contact wire of the rigid current track. A solution in which the two contact wires of the elastic drive system were only connected directly with the free end of the cantilever that holds the contact wire of the rigid contact line system has proved a failure in in-house experiments conducted by the applicant, because of the dynamic behavior.

SUMMARY OF THE INVENTION

The goal of the invention is to improve the device of the type mentioned in the beginning, to the effect that, with a simple structure, it also permits a transition from two parallel contact wires of an elastic contact line system to a rigid contact line system.

This goal is attained by the features indicated in claim 1. Advantageous developments and refinements of the invention can be deduced from the dependent claims.

The basic idea of the invention is to be found in that in the transition area between the rigid and the elastic contact line system, which is defined by the length of the cantilever, three contact wires are to be placed parallel to one another in one plane, wherein the first contact wire coming from the rigid contact line system is essentially clamped over the entire length of the cantilever and ends on the free end of the cantilever. The double contact wires coming from the route are fixed on several sites of the cantilever with multiple clamps. Thus, there is a "soft" transition of the double-wire contact line from the open route with the elastic contact line system to the power track of the rigid contact line system. By the parallel conducting of the three contact wires along the cantilever and the affixing of the double contact wires on the multiple clamps, forces and, in particular, tensile forces of the double-wire contact line are reduced along the cantilever, wherein the soft transition is attained.

A triple clamp, which affixes the three contact wires, is provided on several sites of the cantilever and perhaps on the rigid end of the cantilever or on the end of the rigid power track, pointing to the cantilever. Forces caused by the bending or oscillations of the double-wire contact wires coming from the open route are thus coupled into the cantilever and dampened there or are reduced and not for the first time in the rigid power track, whereas the cantilever, in turn, provides for a soft transition of the current collector of a vehicle from the contact wires of the open route to the contact wire of the power track.

BRIEF DESCRIPTION OF THE FIGURES

The invention will be explained more thoroughly below with the aid of an embodiment example in connection with the drawing. Shown are.

DETAILED DESCRIPTION OF PREFERRED EMBODIMENTS

Figure 1:
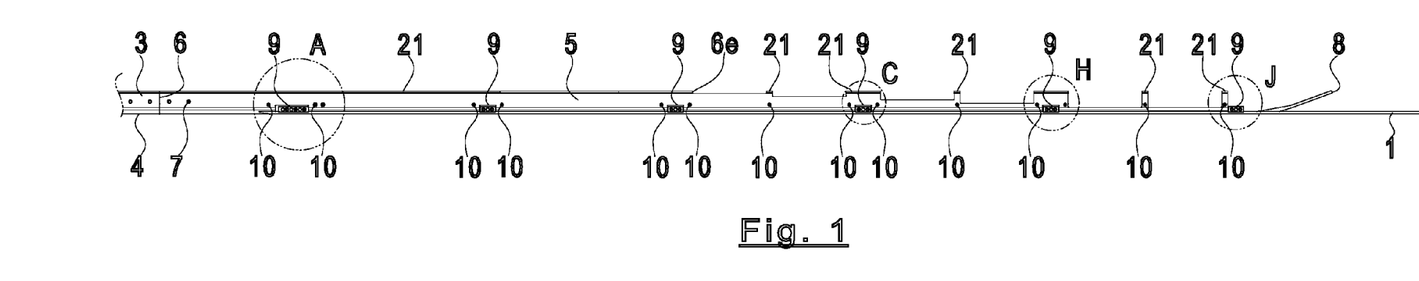
FIG. 1, a side view of the device in accordance with the invention.
Figure 2:
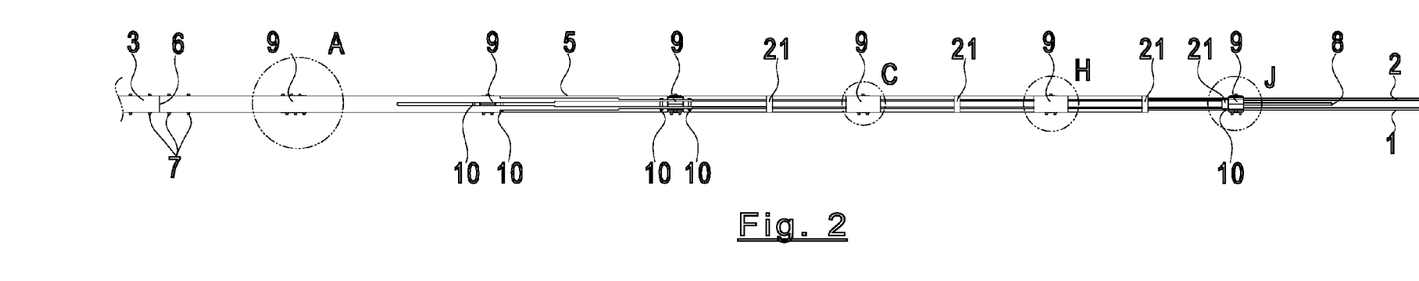
FIG. 2, a top view of the device of FIG. 1.

FIGS. 1 and 2 show the device according to the invention in a side view (FIG. 1) and a top view (FIG. 2). Two parallel contact wires 1 and 2 of an elastic contact line system of a known model are to be converted into a rigid contact line system with a power track 3. The power track 3 has a cross-section profile, which is described in more detail further below and which holds a first contact wire 4. In a transition area between the rigid power track 3 and elastic contact line system, an elongated cantilever 5 is placed, which has a decreasing elasticity or an increasing rigidity in the direction of the elastic contact line system of the two contact wires 1 and 2 toward the rigid power track 3, which, for example, is attained in that the height (in a side view of FIG. 1) of the cantilever 5 and thus its flexural rigidity along the cantilever 5 have different magnitudes. Details of the cantilever 5 and various possible variants of the same can be seen in EP 0 828 629 B1. An end 6 of the cantilever 5, which is adjacent to the power track 3, is rigidly connected with the power track 3 via a coupling flap, wherein in FIG. 1, the corresponding screws 7 can be seen. The cantilever 5 is generally produced from a profile of a rigid power track 3 and in the area of its end 6, which is adjacent to the power track 3, up to the site designated with 6e in FIG. 1, has a cross-section profile identical to the rigid power track 3 with the exception of recesses for multiple clamps 9. In the area of the site 6e up to the free end of the cantilever 5, the profile is processed in such a way that from above—that is, the side of the profile turned away from the contact wires, material is removed to various depths so as to implement the spring characteristics of the cantilever, wherein at intermediate sites, narrow areas with the complete profile are left standing (see FIGS. 10 and 14).

The first contact wire 4 continuously extends from the power track 3 into the area of a free end of the cantilever 5 and is essentially clamped in its profile over the entire length of the cantilever 5. The end 8 of the contact wire 4 is bent upwards so that a current collector of a vehicle cannot "get entangled" there. The double contact wires 1 and 2 of the elastic contact line system are affixed on multiple clamps 9 together with the first contact wire 4, wherein in the longitudinal direction of the cantilever 5, several such multiple clamps are situated in a distributed manner. Details of these multiple clamps are shown in connection with FIG. 7.

The contact wires 1 and 2 free from the cantilever 5 run in the area between the multiple clamps 9, whereas the first contact wire 4 is affixed over the entire length of the cantilever with the exception of the sites of the multiple clamps 9. The contact wires 1 and 2 end in the area of that multiple clamp 9, which is located closest to the rigid end 6 of the cantilever 5. Thus, in principle, the three contact wires 1, 2, and 4 essentially run over the entire length of the cantilever 5 parallel to one another and parallel to the driving plane. Thus, all of them have the same constant distance to the driving plane—that is, to the power track of the rail vehicle.

Individual sites of the cantilever, which are designated with circles and the letters A, C, H, and J in FIGS. 1 and 2, are described in more detail in connection with FIGS. 3-14.

For an easier understanding of FIG. 3, the screws or screw parts, which are not visible from below in the view, are represented in thin, broken lines. Likewise, the not visible lines of the contact wires 1, 2, and 4, which are covered by the profile of the cantilever or that of the multiple clamp 9, are represented by broken lines.

Figure 3:
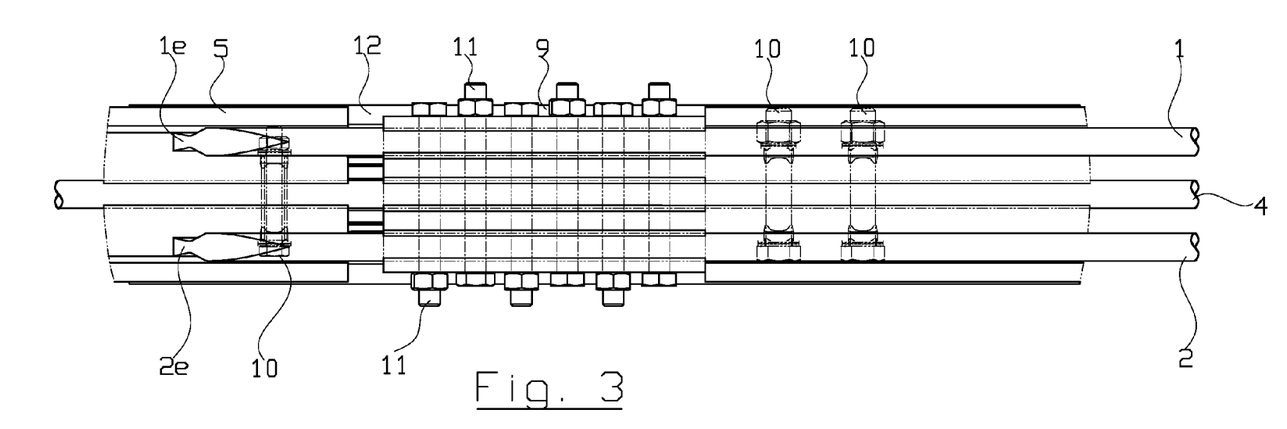
FIG. 3, an enlarged representation of the area A in a view from below.

FIG. 3 shows an enlarged view of the area A of FIGS. 1 and 2 on the lower side of the cantilever 5, pointing to the driving plane, and the three contact wires 1, 2, and 4.

The contact wire 4 is held by the profile of the cantilever 5 and the multiple clamps 9, whereas the double contact wires 1 and 2 are held only by the multiple clamps 9.

The contact wires 1 and 2 have ends 1e and 2e, which were cut slanted and are right behind the last multiple clamp 9—that is, behind the multiple clamp 9 that is closest to the rigid power track 3.

In the area of the multiple clamps 9, the profile of the cantilever 5 has lateral recesses 12, into which the multiple clamps 9 mesh.

The individual multiple clamps 9 are distributed at equal intervals of, for example, 965 mm along the cantilever 5, wherein, however, different intervals can also be used. In the concretely represented embodiment example, 6 multiple clamps are present.

Figure 5:
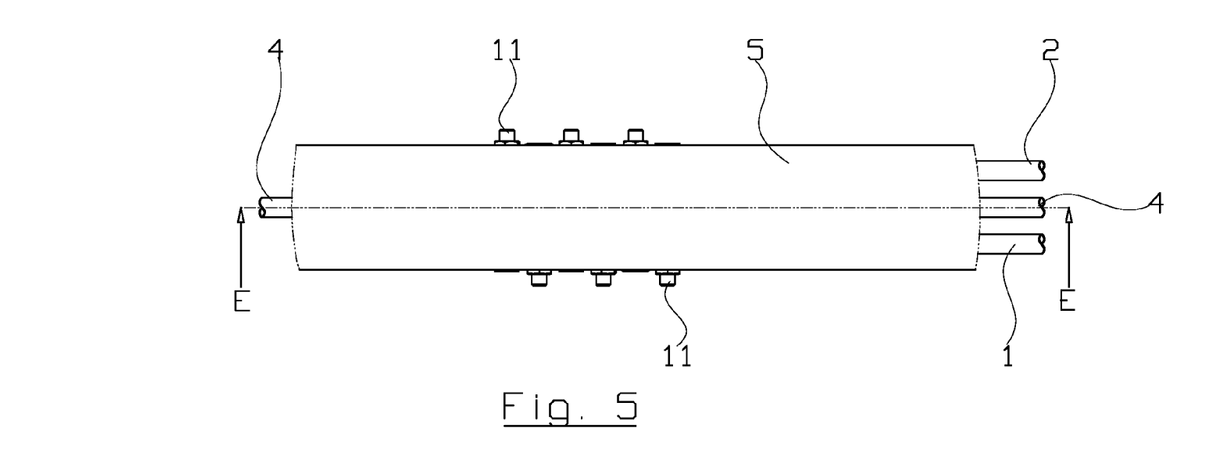
FIG. 5, an enlarged representation of the area A of FIGS. 1 and 2 in a view from above.

In the top view of the area A in accordance with FIG. 5, one can see that the profile of the cantilever 5 is closed above in this area and that the screws 11 are inserted in alternating directions.

Figure 4:
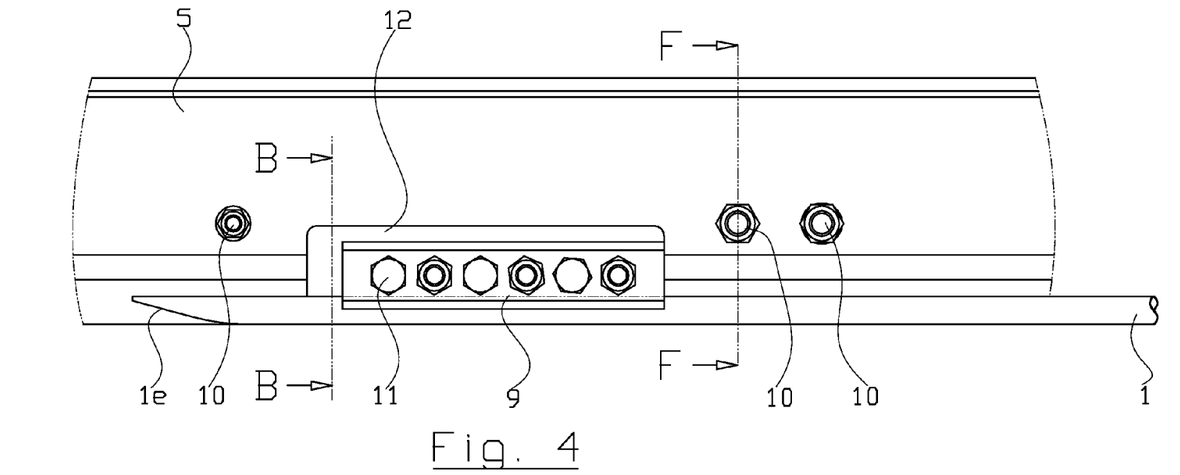
FIG. 4, an enlarged representation of the area A in a side view of FIG. 1.

FIG. 4 shows the area A in side view and clearly reveals the recess 12 and the end 1e of the contact wire 1 cut at an incline.

FIG. 5 shows that the profile of the cantilever 5 in the area A is closed above. (see also FIGS. 7 and 8)

Figure 6:
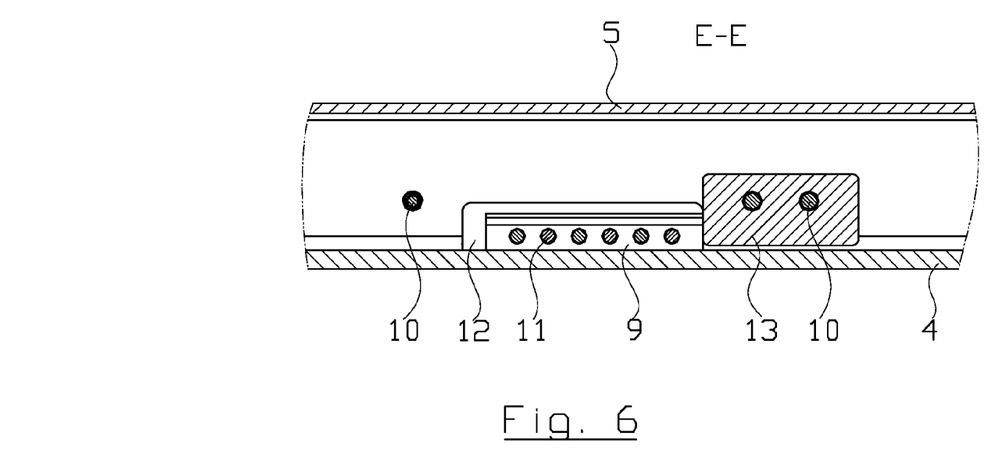
FIG. 6, s section along the line E-E of FIG. 5.

FIG. 6 shows a section along the line E-E of FIG. 5. One can see more clearly the recess 12 for the multiple clamp 9 and also that in the interior of the profile of the cantilever 5, there is a holding block 13, which is held on the cantilever by the screws 10. Details in this regard can be found in FIGS. 7 and 8. In general, a multiple clamp 9 and a holding block can also be provided in an analogous manner on the rigid power track 3, so as to introduce tensile forces directly into the power track 3. In the embodiment example shown, the holding block 13 and the corresponding multiple clamp 9 are located in the area of the cantilever 5, which also has the complete profile of the rigid power track. The holding block 13 offers sufficient supporting surface to the correlated multiple clamp 9, so as to absorb the tensile forces coming from the contact wires 1 and 2 of the free length and introducing them into the power track system.

The holding block 13 is used as the limiting stop for the multiple clamp 9 and thus conducts tensile forces of the tensioned contact wires 1 and 2 into the profile of the cantilever 5 and/or the power track 3. The holding block 13 is therefore located on the side of the multiple clamp 9 pointing to the free route (elastic contact line system).

Figure 7:
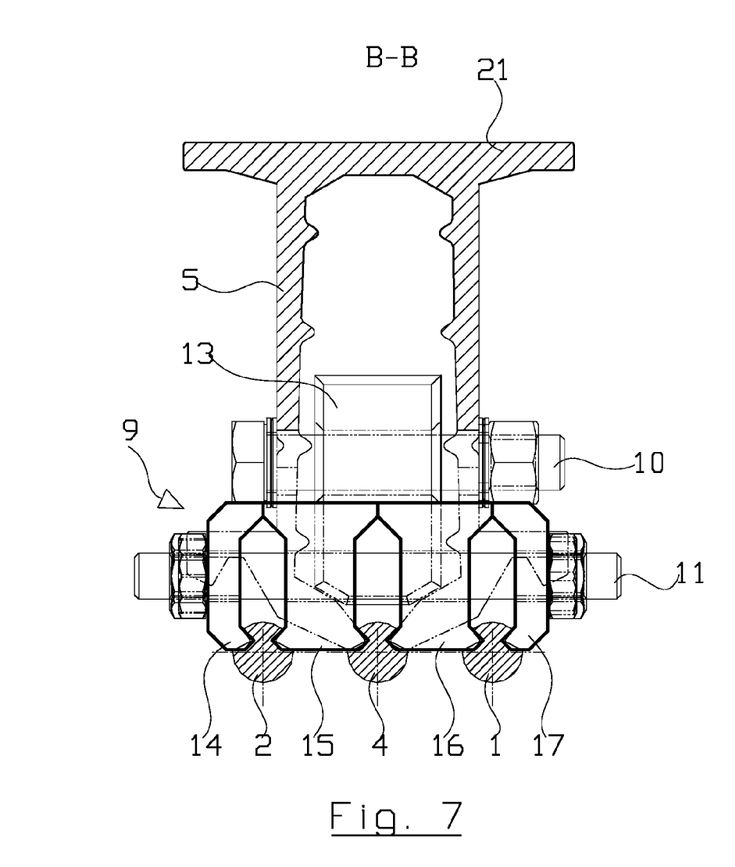
FIG. 7, a cross-section along line B-B of FIG. 4.

FIG. 7 shows a section along the line B-B of FIG. 4. Therefore, one can see the front side of the multiple clamp 9, which is not cut, wherein the section line runs through the recess 12 of FIG. 4.

The multiple clamp 9 is designed here as a triple clamp and has four clamping claws 14, 15, 16, and 17, of which the clamping claws 14 and 17 are external and the clamping claws 15 and 16 are internal clamping claws. The clamping claws 14 and 15 form a first pair and the clamping claws 16 and 17 form a second pair, wherein the pairs are situated mirror-symmetrical to a vertical middle axis of the first contact wire 4. The external clamping claws 14 and 17 tension the outside of the contact wires 2 and 1, whereas the two internal clamping claws 15 and 16 clamp the inside of the contact wires 2 and 1 and jointly also, the first contact wire 4. Accordingly, the clamping claws have sharp-edge clamping projections, which mesh into the contact wires in a form-locking manner. Side surfaces of the clamping claws 14-17, lying in the area of the upper side turned away from the contact wires 1, 2, and 4 are in contact with clamping claws that are adjacent to the surfaces, wherein all clamping claws have passage boreholes through which the screws 11 penetrate and are screwed with nuts.

Figure 8:
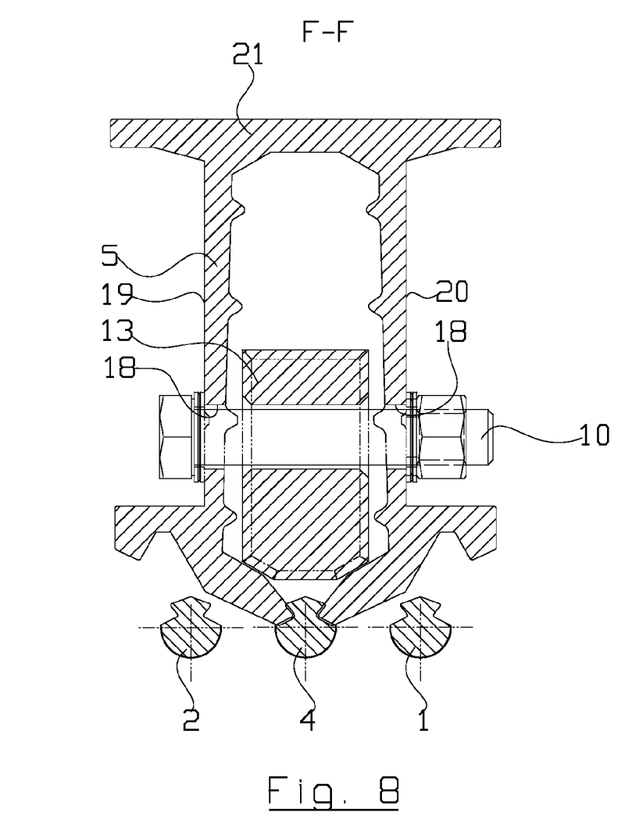
FIG. 8, a section along the line F-F of FIG. 4.

As a result of the aforementioned recess 12, the first contact wire 4 in the area of the multiple clamp 9 is also held only by the clamping claws 15 and 16, since the profile of the cantilever 5 has the recess 12 here. Before and behind the multiple clamp 9, the profile of the cantilever 5 is again complete and tensions the first contact wire 4 in a known manner, whereas the contact wires 1 and 2 run freely outside the multiple clamp 9 as can be seen in FIG. 8.

In the line of vision looking toward the open route—that is, the elastic contact line system—one finds behind the multiple clamp 9 the holding block 13, which is affixed by the screw 10 on the cantilever 5. The two middle clamping claws 15 and 16 are supported on the holding block 13, which thus captures the tensile forces acting from the open route via the contact wires 1 and 2, and introduces them into the cantilever 5 (or the rigid power track 3).

FIG. 7 shows the parts of the profile of the cantilever 5 concealed by the clamping claws 14-17 or the screws 10 and 11 in thin broken lines. The screws 10 are also placed on both sides of the multiple clamps 9 and in the area of the cantilever on the sites with the full cross-section profile, so as to stop a spreading apart of the profile and to clamp in reliably the contact wire 4.

The multiple clamps 9 are thus not affixed directly on the cantilever 5, but rather in the direction of the contact wires 1, 2, and 4 toward the open route merely supported on the holding block 13 and otherwise connected with the profile of the cantilever 5 via the first contact wire 4. The multiple clamp 9 can therefore carry out smaller movements relative to the cantilever 5 and thus dampen oscillations of the contact wares and compensate for thermally caused length changes.

FIG. 8 shows a section along the line F-F of FIG. 4. Here, the cantilever 5 (still) has the profile of the rigid power track 3. It is a standard profile, which clamps the first contact wire 4 in a known manner. Deviating from the standard profile, the cantilever here has a passage borehole 18 to hold the screw 10, with which the holding block 13 is affixed to the cantilever 5. The width of the holding block 13 is thereby smaller than the inner bore of the two vertical legs 19 and 20 of the profile of the cantilever 5, so that the holding block 13 does not hinder the clamping of the contact wire 4. The screw 10 is therefore used here simultaneously to hold the holding block 13 and to clamp the contact wire 4.

Figure 9:
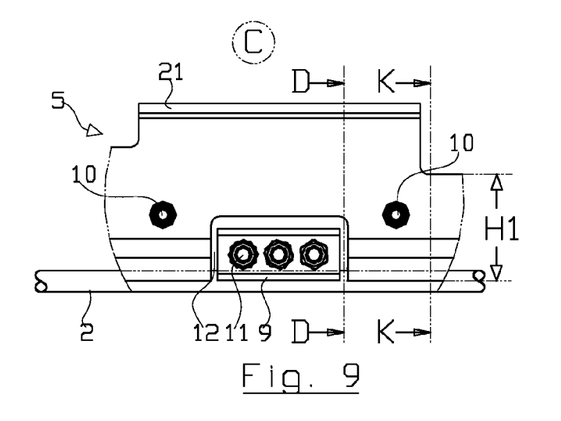
FIG. 9, an enlarged side view of the area C of FIG. 1.
Figure 10:
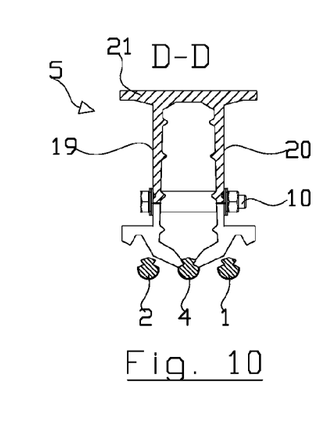
FIG. 10, a section along the line D-D of FIG. 9.
Figure 11:
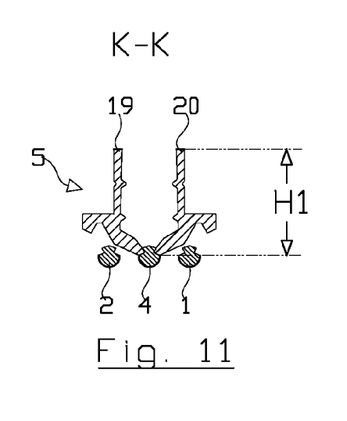
FIG. 11, a section along the line K-K of FIG. 9.

FIG. 9 shows a side view of the cantilever 5 at the site C of FIG. 1. FIGS. 10 and 11 show sections along the lines D-D and K-K of FIG. 9.

Figure 12:
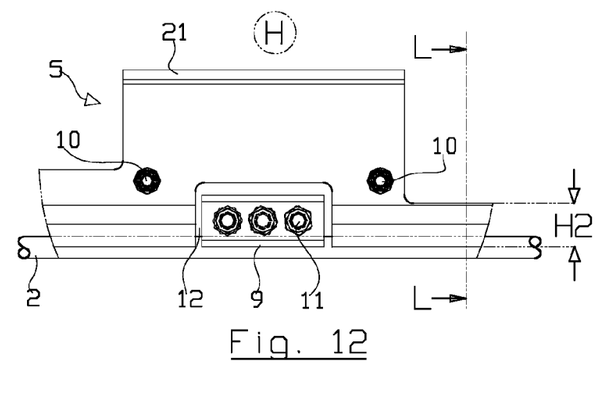
FIG. 12, an enlarged side view of the area H of FIG. 1.

In an analogous manner, FIG. 12 shows a side view of the cantilever 5 at the site H of FIG. 1.

Figure 13:
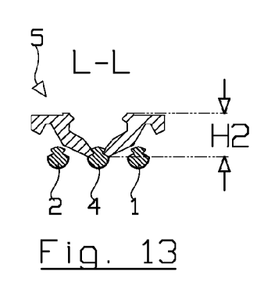
FIG. 13, a section along the line L-L of FIG. 12.

FIG. 13 shows a section along the line L-L of FIG. 12.

From FIGS. 9-13, one can see that at some sites and, in particular, in the area of the multiple clamps 9, the cantilever 5 has a closed profile corresponding to FIG. 10, in which the two vertical legs 19 and 20 are connected with one another on their ends turned away from the contact wires 1, 2, 4 by a horizontal leg 21, which protrudes on both sides over the vertical legs 19 and 20.

In other areas, which are shown are shown by the sections K-K and L-L, on the other hand, the vertical legs 19 and 20 are shortened and the horizontal leg is missing, wherein the heights H1 and H2 and the various sites for the adjustment of the spring characteristics of the cantilever 5 are different. Furthermore, one can clearly see in FIGS. 9 and 10 that in the area of the multiple clamps 9, the cantilever 5 has the recess 12, into which the multiple clamp 9 is inserted, wherein the recess 12 is larger in the longitudinal direction of the contact wires than the multiple clamp 9, so that the latter has a certain mobility in the longitudinal direction of the contact wires.

Figure 14:
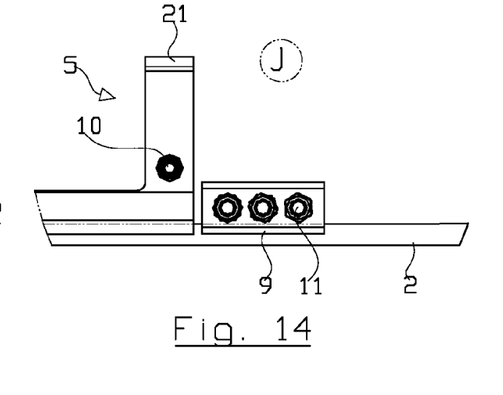
FIG. 14, an enlarged side view of the area J of FIG. 1.

FIG. 14 shows an enlarged representation of the site J of FIG. 1 with the free end of the cantilever 5, which in turn has the profile in accordance with FIG. 10 and a screw 10 for the clamping of the first contact wire 4. In the direction toward the open route with the elastic contact wares, another multiple clamp 9 is located outside the cantilever 5; it thus has no direct connection with the cantilever 5.

The invention claimed is:

1. A device for the coupling of elastic and rigid contact line systems for the supply of power to electrical locomotives, comprising:
   an elongated cantilever adapted for placement in a transition area between the rigid and the elastic contact line system, whose rigidity increases in its longitudinal direction;
   several multiple clamps situated in a distributed manner along the cantilever adapted to receive a) a first contact wire of the rigid contact line system and b) two contact wires of the elastic contact line system, with the two contact wires of the elastic contact line system held parallel to the first contact wire, with all three contact wires affixed on the several multiple clamps;
   wherein the multiple clamps are located in recesses of the cantilever;
   wherein the multiple clamps have two pairs of clamping claws located in a mirror-symmetrical manner, each of which is adapted to clamp one of the contact wires of the elastic contact line system, and wherein one clamping claw of the pair of clamping claws is adapted to clamp the first contact wire of the rigid contact line system;
   wherein the clamping claws have passage boreholes to hold at least one screw.

2. The device according to claim 1, wherein each of the multiple clamps has the same distance to an adjacent multiple clamp.

3. The device according to claim 1, wherein the length of the multiple clamps is shorter in the longitudinal direction of the cantilever than the length of the correlated recess.

4. The device according to claim 1, wherein at least one of the multiple clamps is supported on a holding block and the holding block is firmly connected with the cantilever.

5. The device of claim 1 in position coupling the elastic and rigid contact line systems for the supply of power to electrical locomotives, wherein:
   the rigidity of the cantilever increases in the longitudinal direction from the elastic contact line system to the rigid contact line system;
   the first contact wire is held on the rigid contact line system and on the cantilever;
   the two contact wires of the elastic contact line system are located along the cantilever parallel to the first contact wire, and all three contact wires are affixed on the several multiple clamps situated in the distributed manner along the cantilever.

6. The device according to claim 5, wherein each of the multiple clamps has the same distance to an adjacent multiple clamp.

7. The device according to claim 5 wherein the length of the multiple clamps is shorter in the longitudinal direction of the contact wires than the length of the correlated recess.

8. The device according to claim 5, wherein at least one of the multiple clamps is supported on a holding block in the direction of the elastic contact line system and the holding block is firmly connected with the cantilever or the rigid power track.

9. The device according to claim 8, wherein the multiple clamp closest to the rigid contact line system is supported on the holding block.

10. The device according to claim 8, wherein only the multiple clamp closest to the rigid contact line system is supported on the holding block.

11. The device according to claim 5, wherein the multiple clamp closest to the elastic contact line system is free of the cantilever.

12. The device according to claim 5, wherein in the area of the multiple clamps, the first contact wire is affixed only on the correlated multiple clamp.

13. The device according to claim 5, wherein the multiple clamps have two pairs of clamping claws located in a mirror-symmetrical manner, each of which clamps one of the contact wires of the elastic contact line system, and in that a clamping claw of the pair of clamping claws clamps the first contact wire of the rigid contact line system.

14. The device according to claim 13, wherein the ends of the clamping claws turned away from the contact wires are in contact with side areas of the adjacent clamping claw and in that all clamping claws have passage boreholes to hold at least one screw.

15. A device for the coupling of elastic and rigid contact line systems for the supply of power to electrical locomotives, comprising:
    an elongated cantilever located in a transition area between the rigid and the elastic contact line system, whose rigidity increases in the longitudinal direction from the elastic contact line system to the rigid contact line system;
    a first contact wire, which is held on the rigid contact line system and on the cantilever;
    wherein two contact wires of the elastic contact line system are located along the cantilever parallel to the first contact wire, in that all three contact wires are affixed on several multiple clamps situated in a distributed manner along the cantilever; and
    the multiple clamps are located in recesses of the cantilever;
    wherein at least one of the multiple clamps is supported on a holding block in the direction of the elastic contact line system and the holding block is firmly connected with the cantilever or the rigid power track; and
wherein the multiple clamp closest to the rigid contact line system is supported on the holding block.

16. The device according to claim 15, wherein each of the multiple clamps has the same distance to an adjacent multiple clamp.

17. The device according to claim 15, wherein the length of the multiple clamps is shorter in the longitudinal direction of the contact wires than the length of the correlated recess.

18. The device according to claim 15, wherein the multiple clamp closest to the elastic contact line system is free of the cantilever.

19. The device according to claim 15, wherein in the area of the multiple clamps, the first contact wire is affixed only on the correlated multiple clamp.

20. The device according to claim 15, wherein the multiple clamps have two pairs of clamping claws located in a mirror-symmetrical manner, each of which clamps one of the contact wires of the elastic contact line system, and in that a clamping claw of the pair of clamping claws clamps the first contact wire of the rigid contact line system.

21. The device according to claim 20, wherein the ends of the clamping claws turned away from the contact wires are in contact with side areas of the adjacent clamping claw and in that all clamping claws have passage boreholes to hold at least one screw.

22. A device for the coupling of elastic and rigid contact line systems for the supply of power to electrical locomotives, comprising:
    an elongated cantilever located in a transition area between the rigid and the elastic contact line system, whose rigidity increases in the longitudinal direction from the elastic contact line system to the rigid contact line system;
    a first contact wire, which is held on the rigid contact line system and on the cantilever;
    wherein two contact wires of the elastic contact line system are located along the cantilever parallel to the first contact wire, in that all three contact wires are affixed on several multiple clamps situated in a distributed manner along the cantilever; and
    the multiple clamps are located in recesses of the cantilever;
    wherein at least one of the multiple clamps is supported on a holding block in the direction of the elastic contact line system and the holding block is firmly connected with the cantilever or the rigid power track; and
wherein only the multiple clamp closest to the rigid contact line system is supported on the holding block.

* * * * *